United States Patent [19]

Bifano

[11] Patent Number: 5,783,371
[45] Date of Patent: Jul. 21, 1998

[54] PROCESS FOR MANUFACTURING OPTICAL DATA STORAGE DISK STAMPER

[75] Inventor: Thomas G. Bifano, Mansfield, Mass.

[73] Assignees: Trustees of Boston University; Peter Ciriello, both of Dover, Mass.; part interest to each

[21] Appl. No.: 625,820

[22] Filed: Apr. 1, 1996

Related U.S. Application Data

[63] Continuation-in-part of Ser. No. 281,971, Jul. 29, 1994, Pat. No. 5,503,963.
[51] Int. Cl.$^6$ .................................................. G11B 7/26
[52] U.S. Cl. ..................... 430/321; 430/320; 430/945; 264/2.5; 264/107; 216/24; 216/66
[58] Field of Search .............................. 430/321, 320, 430/945, 9, 11; 264/2.5, 107; 216/24, 66

[56] References Cited

U.S. PATENT DOCUMENTS

| | | |
|---|---|---|
| 4,598,038 | 7/1986 | Ahne . |
| 4,609,613 | 9/1986 | Cogar et al. . |
| 4,655,876 | 4/1987 | Kawai et al. . |
| 4,724,043 | 2/1988 | Bergendahl et al. . |
| 4,797,616 | 1/1989 | Heoq et al. . |
| 4,806,454 | 2/1989 | Yoshida et al. . |
| 4,956,214 | 9/1990 | Imataki et al. . |
| 5,008,176 | 4/1991 | Kondo et al. . |
| 5,090,982 | 2/1992 | Bradshaw et al. . |
| 5,096,563 | 3/1992 | Yoshizawa et al. . |
| 5,110,707 | 5/1992 | Fujita et al. ................... 430/256 |
| 5,112,727 | 5/1992 | Inui et al. . |
| 5,114,531 | 5/1992 | Fukushima et al. . |
| 5,166,014 | 11/1992 | Ledieu ............................ 430/16 |
| 5,230,770 | 7/1993 | Kashiwagi . |
| 5,238,786 | 8/1993 | Kashiwagi . |
| 5,243,589 | 9/1993 | Stuke et al. . |
| 5,244,775 | 9/1993 | Miwa et al. . |
| 5,246,531 | 9/1993 | Junji et al. . |
| 5,264,327 | 11/1993 | Kamio . |
| 5,324,689 | 6/1994 | Yoo . |
| 5,330,880 | 7/1994 | Horigome et al. ............... 430/321 |

FOREIGN PATENT DOCUMENTS

| | | |
|---|---|---|
| 0165804 | 12/1985 | European Pat. Off. . |
| 0540843 | 5/1993 | European Pat. Off. . |
| 0699916 | 1/1996 | European Pat. Off. . |
| 63-217545 | 9/1988 | Japan . |
| 1112543 | 5/1989 | Japan . |
| 1155530 | 6/1989 | Japan . |
| 3-150738 | 6/1991 | Japan . |
| 9604652 | 2/1996 | WIPO . |

OTHER PUBLICATIONS

M. Ashby and D. Jones, "B. Ceramics and Glasses." Engineering Materials 2, (Chs. 15 & 16) 146–161, (1986).
Allen, L. and Keim, R., "An ion figuring system for large optic fabrication." SPIE: Current Developments in Optical Engineering and Commercial Optics. Vol. 1168, pp. 33–50 (1989).
Asai, A., Takahashi, H., Izumi, S., Taniguchi, I., "Evaluation of Surface Damage on Silicon Induced by Reactive Ion Etching Using Current–Voltage Characteristics." Electronics and Communications in Japan Part 2. Vol. 75, No. 2, pp. 72–78 (1992).
Bifano, T.G., "Ductile–regime grinding of brittle materials." North Carolina State University (1988).
Brett, R.L. and Bowen, P., "Fracture toughness assessment of a silicon carbide–based ceramics and particulate–reinforced composites." Composites. Vol. 24, No. 2, pp. 177–183 (1993).
Coburn, J.W. and Winters, H.F., "Ion–and electron–assisted gas–surface chemistry–An important effect in plasma etching." Journal of Applied Physics, vol. 50(5), 3189–3196 (May 1979).
Dizon, R., Han, H., Russel, A., and Reed, M., "An Ion Milling Patern Transfer Technique for Fabrication of Three–Dimensional Micromechanical Structures." Journal of Microelectromechanical Systems. Vol. 2, No. 4(1993).
Egert, C.M., "Roughness Evolution of Optical Materials Induced by Ion Beam Milling." Proceedings of SPIE. Vol. 1752, pp. 63–72 (1992).
Fawcett, S., Drueding, T., and Bifano, T., "Neutral ion figuring of chemical vapor deposited SiC." Optical Engineering. Vol. 33, No. 3, pp. 967–974 (Mar. 1994).
Hensley, Jr., J., Risbud, S., Groza, J. and Yamazaki, K., "Plasma–Activated Sintering of Aluminum Nitride" Journal of Materials Engineering and Performance. Vol. 2(5), pp. 665–669 (Oct. 1993).
Hoffman, R. and Lange, W., "Ion Polishing of Metal Surfaces." Optical Engineering. Vol. 16, No. 4, pp. 338–346 (Jul.–Aug. 1977).
Hoffman, R., Lange, W., Gowan, J., Miglionico, C., "Ion Polishing as a Surface Preparation for Dielectric Coating Of Diamond–Turned Optics." Optical Engineering. Vol. 17, No. 6, pp. 578–585 (Nov.–Dec. 1978).

(List continued on next page.)

Primary Examiner—John A. McPherson
Attorney, Agent, or Firm—Hunton & Williams

[57] ABSTRACT

A process for manufacturing an optical data storage disk stamper includes the steps of providing an amorphous electroless nickel substrate including phosphorous in the amount in a range of about 5 to 15 percent by weight having a toughness of about 100 MPa$\sqrt{\text{m}}$, a roughness in a range of about 1 to 50 nm, and a flatness of about 6 μm and depositing a negative photoresist on a surface of the substrate. The substrate has a diameter greater than about 120 mm and a thickness greater than about 300 μm. The negative photoresist then is exposed with a laser to form a negative, data pattern in the photoresist. The photoresist is developed, and the ceramic substrate is ion machined to form the data pattern, in the substrate, such that a spiral track of ridges and lands is formed wherein each ridge has a height of less than about 150 nm. After the data pattern has been ion machined into the substrate, the developed photoresist is stripped from the substrate.

36 Claims, 9 Drawing Sheets

OTHER PUBLICATIONS

Kaufman, H., Reader, P., and Isaacson, G., "Ion Sources for Ion Machining Applications." *AIAA Journal.* Vol. 15, No. 6, pp. 843–847 (Jun. 1977).

Lo, T. and Huang, H., "Effects of Oxygen Addition in the $CCl_4$ Reactive Ion Etching of A–SiC:H films." *Jpn J. Applied Physics.* Vol. 31, Pt. 1, No. 12A, pp. 4061–4065 (Dec. 1992).

McNeil, J., and Herrmann, Jr., W., "Ion beam applications for precision infrared optics." *Journal of Vacuum Science Technology.* Vol 20(3), pp. 324–326 (Dec. 1992).

Oehrlein, G., Kroesen, G. and Lindstrom, J., "Etching of silicon in low–pressure plasmas containing fluorine and oxygen: A comparison of real–time and postplasma surface studies." *J. Vac. Sci. Technol. A.* 10(5), pp. 3092–3099 (Sep./Oct. 1992).

Padture, N., "In Situ–Toughened Silicon Carbide." *Journal of the American Ceramic Society.* 77[2], pp. 519–523 (1994).

Raghavan, N., "Pressureless sintering of aluminum nitride: effect of concentration of additives and sintering conditions on properties." *Materials Science and Engineering.* A148, pp. 307–317 (1991).

Sawin, H., "A Review of Plasma Processing Fundamentals." *Solid State Technology.* pp. 211–216 (Apr. 1985).

Schroeder, J., Dieselman, H., and Douglass, J., "Technical Feasibility of Figuring Optical Surfaces by Ion Polishing." *Applied Optics.* Vol. 10, No. 2, pp. 295–299 (Feb. 1971).

Schuhrke, T., Mandl, M., Zweck, J., and Hoffmann, H., "Investigation of surface amorphization of silicon wafers during ion–milling." *Ultramicroscopy.* Vol. 41, pp. 429–433 (1992).

Sigl, L., and Kleebe, H., "Core/Rim Structure of Liquid–Phase–Sintered Silicon Carbide." *Journal of the American Ceramic Society.* 76([3], pp. 773–774 (1993).

Singh, V., Shaqfeh, E., and McVittie, J., "Simulation of profile evolution in silicon reactive ion etching with re–emission and surface diffusion." *J. Vac. Sci. Technol. B.* 10(3), pp. 1091–1104 (May/Jun. 1992).

Sites, J., Gilstrap, P., and Rujikoralcarn, R., "Ion beam sputter deposition of optical coatings." *Optical Engineering.* Vol 22, No. 4, pp. 447–449 (Jul./Aug. 1983).

Spiller, E., "Enhancement of the reflectivity of multilayer x–ray mirrors by ion polishing." *Optical Engineering.* Vol. 29, No. 6, pp. 609–613 (Jun. 1990).

Wilson, S., Reicher, D., and McNeil, J., "Surface figuring using neutral ion beams." *SPIE: Advances in Fabrication and Metrology for Optics and Large Optics.* Vol 966, pp. 74–81 (1988).

Wong, T., Ingram, S., Moore, D. and Broers, A., "Fabrication of Sub–20 NM Structures in Silicon Nitride Using $CHF_3/O_2$ RIE." *Microelectronic Engineering.* 17, pp. 531–534 (1992).

Yapsir, A., "Dry surface cleaning in integrated vacuum reactive ion etching processes." *J. Vac. Sci. Technol. A.* 10(4), pp. 792–794 (Jul./Aug. 1991).

Zafran, S., Kaufman, K., and Silver, M. "Ion polishing of optical surfaces." *Optical Engineering.* Vol. 21, No. 6 (Nov./Dec. 1982).

Zarowin, C., "Comparison of the smoothing and shaping of optics by plasma–assisted chemical etching and ion milling using the surface evolution theory." *Applied Optics.* Vol. 32, No. 16 (Jun. 1993).

N.M. Nartyak et al., "Structure of Electroless Nickel Coatings." *Plating and Surface Finishing.* Vol. 80, No. 6 (Jun. 1993) pp. 60–63.

Donald W. Baudrand. "Electroless Nickel Plating." *ASM Handbook.* Vol. 5, (Dec. 1994) pp. 290–309.

George A. DiBari. "Nickel Plating." *ASM Handbook.* Vol. 5, (Dec. 1994) pp. 201–121.

Michael B. Bever. "Electrodeposited Organic Coatings" Vol. 2, (1986) pp. 1436–1440.

PROCESS FOR MANUFACTURING OPTICAL DATA STORAGE DISK STAMPER

This is a continuation-in-part of application Ser. No. 08/281,971, filed Jul. 29, 1994, issued as U.S. Pat. No. 5,503,963 on Apr. 2, 1996.

BACKGROUND OF THE INVENTION

1. Field of the Invention

The present invention relates to processes for manufacturing an optical data storage disk stamper from an ion machinable amorphous metal substrate, and more particularly, to processes for replicating optical data storage disks using such stampers. The invention further relates to stampers manufactured by such processes and disks replicated using such stampers.

2. Description of the Related Art

Figure 1:
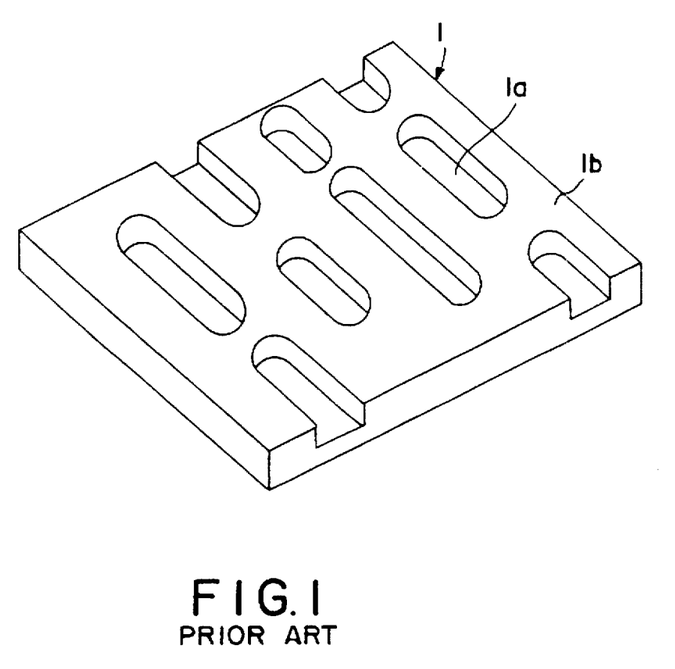
FIG. 1 depicts an enlarged portion of a spiral track from a compact disk showing a data pattern of pits and lands.

Optical data storage disks are widely used, for example, as audio and video disks, e.g., compact disks, and in computer systems as part of compact disk read-only-memory devices for data storage and retrieval. An optical data storage disk may contain digital data in a spiral track of binary codes. These codes are formed on the disk as data patterns of minute pits and lands. FIG. 1 depicts an enlarged portion of a spiral track 1 from a compact disk (not shown) showing a sequence of pits 1a and lands 1b. In an audio disk, for example, the pits and lands in track 1 represent various types of binary codes, such as left-hand and right-hand stereo sound codes and codes which control disk reader motor speed and provide timings. Disk readers for decoding such tracks are well known.

For example, an optical data storage disk reader may rotate a disk with a diameter of about 125 mm at a playing speed of about 500 revolutions per minute at the center of the disk, at which a track begins, and at about 200 revolutions per minute at the end of the track near the outer edge of the disk. Nevertheless, the linear speed of the disk remains substantially constant, as it passes over an optical read-out device that decodes the track. Such optical read-out devices may include a configuration of mirrors and lenses, which directs a beam of light, such as a laser beam, at the spiral track. As the disk rotates, the directed beam may move outward from the center of the disk toward the disk's edge across the rotating track. When the beam is directed at a land portion of the track, it is reflected creating a light signal, and a photosensitive switch, such as a photosensitive diode, may be used to convert this reflected light signal into an electric signal. However, when the beam enters a pit in the track, it is not reflected, and no such electric signal is produced.

Figure 2A:
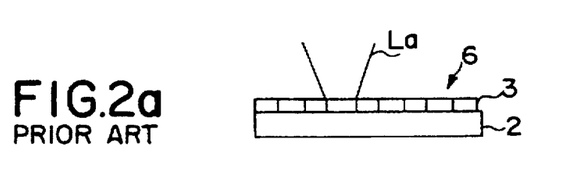
FIGS. 2a–g are a schematic of cross-sectional illustrations showing steps in a conventional process for manufacturing an optical data storage disk stamper.

A conventional process for manufacturing an optical data storage disk stamper is described in U.S. Pat. No. 5,096,563 to Yoshizawa et al., which is incorporated herein by reference. FIGS. 2a–g are a schematic of cross-sectional illustrations showing steps in a conventional process for manufacturing an optical data storage disk stamper. In such a conventional process, a photoresist master disk includes a photoresist layer 3 deposited on the main surface of a glass substrate 2, such as plate soda-lime glass, as shown in FIG. 2a. Soda lime glass is made by fusion of sand with sodium carbonate or sodium sulfate and lime or limestone.

Figure 2B:
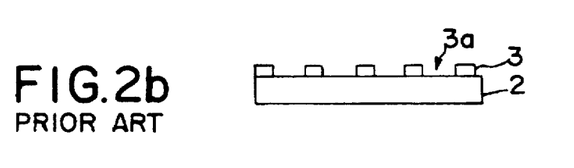

A laser beam La, which flickers according to a digital signal, exposes photoresist layer 3 to helically or concentrically form a data pattern 6 consisting of a latent image of a track of spots, e.g., pit locations. Either, a positive or a negative photoresist may be used. When a positive photoresist is used, areas exposed to light are removed by the development process. Conversely, when a negative photoresist is used, areas not exposed to light are removed by the development process. The exposed photoresist master disk then is developed to create a track of minute pits 3a corresponding to a digital signal to be recorded on the photoresist master disk, thus producing a developed master disk which has pit-carrying photoresist layer 3 and glass substrate 2, as shown in FIG. 2b.

Figure 2C:
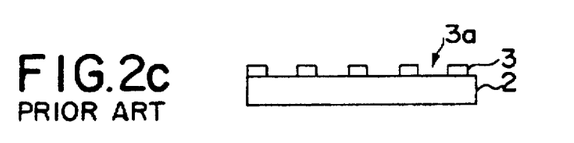
Figure 2D:
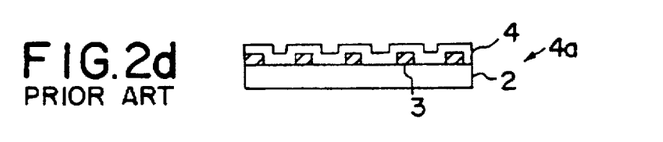

Photoresist layer 3 of the developed master disk then is dried and fixed on glass substrate 2 to produce a dried master disk, as shown in FIG. 2c. A conductive metal, such as silver or nickel, may be sputtered on or applied by wet metalization to photoresist layer 3 to form a conductive film 4, rendering the surface of the developed master disk conductive and creating a mastering disk 4a having a multi-layered structure, as shown in FIG. 2d. Conductive film 4 may have a thickness of only a few molecules.

Figure 2E:
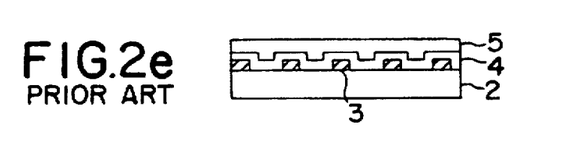
Figure 2F:
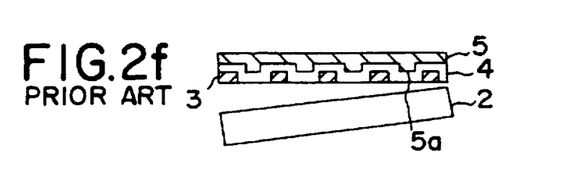
Figure 2G:
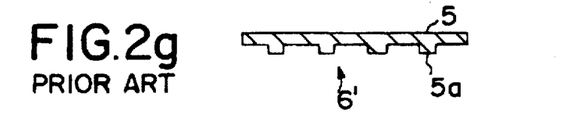

Mastering disk 4a then may be immersed in a nickel electroforming tank to plate conductive film 4 with nickel. As a result, a nickel layer 5, i.e., a nickel stamper, is formed, as shown in FIG. 2e. Nickel stamper 5 has a series of ridges 5a, each of which may be continuous or discrete and may correspond to one of pits 3a created in photoresist layer 3. Nickel layer or stamper 5 is separated from glass substrate 2, as shown in FIG. 2f, to create a negative die of the spiral track to be replicated on the optical data storage disk. Because nickel stamper 5 is extremely delicate, stamper 5 may be removed from glass substrate 2 by hand. Photoresist layer 3 (and conductive film 4) then may be removed from stamper 5, yielding nickel stamper 5 with a mold surface 6' bearing a negative image of data pattern 6, as shown in FIG. 2g. If conductive film 4 is formed from nickel, however, it may be left in place and may simply become part of stamper 5. After photoresist layer 3 (and conductive film 4) has (have) been removed from stamper 5, stamper 5 is rinsed, and a protective lacquer coating (not shown) may be applied to the surface of the negative die. The lacquer coating then may be cured, and the surface of stamper 5 opposite the negative die may be polished to remove any imperfections caused during the nickel plating.

After stamper 5 has been lacquered and polished, a hole may be punched in the center of stamper 5 in order to fix it to an injection molding apparatus. Punching the hole in stamper 5, however, may create stresses in the nickel and cause imperfections in the spiral track. Such stresses are unavoidable and nickel stamper 5 then is fixed in a mold of the injection molding apparatus. After the injection mold is closed, a thermoplastic resin, such as flowable polymethyl methacrylate, polycarbonate, acrylic resin, epoxy resin, unsaturated polyester resin, or the like, is injected onto the mold filling the track formed in stamper 5 with resin. After the resin has hardened, it is separated from stamper 5, providing an optical data storage disk replica having a face on which the binary code described by the data pattern is recorded.

A reflective material, such as aluminum or gold, including aluminum and gold alloys, may be applied to the data pattern face of replicas produced in this manner. Further, a protective lacquer film is coated on the reflective material, forming an optical disk. Two optical data storage disk replicas may be formed in this manner, bonded together, and subjected to a finishing process to produce a double-sided optical data storage disk.

The electroforming of a nickel stamper in conventional processes is a relatively time consuming procedure. Further, because of the delicate procedures associated with the electroforming step, current processes have not been fully automated. Manufacturing a conventional nickel stamper may take longer than about 180 minutes. The additional time required to manufacture stamper 5 by conventional processes makes such processes inefficient for replicating recently developed optical data storage disks which may involve small production quantities of a variety of types of audio/visual software. Moreover, current electroforming procedures employ toxic chemicals and require the disposal of hazardous materials, including solutions containing heavy metals, e.g., nickel. The lacquering procedure used as part of the finishing process also may produce significant quantities of toxic fumes and hazardous materials.

As mentioned above conventional stampers made from an electroformed layer of nickel are delicate and have limited lives. Repeated handling of conventional stampers may result in their deformation or other damage. Further, disk finishing procedures, e.g., lacquering, polishing, and hole punching, may result in the uneven application of lacquer and imperfection of or damage to the spiral tracks due to hole punching or polishing. Stampers suffering from such manufacturing imperfections or damage are discarded, and the manufacturing process is repeated to create new stampers. Finally, because electroformed nickel is susceptible to oxidation or pitting due, for example, to the presence of alkalis in the glass substrate, when stored, nickel stampers are closely monitored to detect signs of such deterioration. Such deteriorated stampers may be unusable. Therefore, stampers exhibiting oxidation or pitting or other physical damage are also discarded, and new stampers are manufactured to replace them. In addition, nickel stampers may produce stains on the disk replicas. Disks exhibiting such stains have little or no commercial value and are discarded, and therefore, such stains reduce the yield of the replicating processes.

SUMMARY OF THE INVENTION

Thus, a need has arisen for a process for manufacturing an optical data storage disk stamper which does not require the electroforming, e.g., nickel electroforming, step or lacquering procedure and eliminates the chemical waste associated with the electroforming step and the lacquering procedure. Moreover, a need has arisen for a process for manufacturing an optical data storage disk stamper which achieves a reduction in manufacturing time and, in particular, which achieves a reduction in stamper machining time. Further, a need has arisen for a process for manufacturing such disk stampers, which may be fully automated. In addition, a need has arisen for a process for manufacturing such disk stampers, which produces a durable stamper that is less prone to deformation or other damage in use or deterioration in storage than stampers produced by conventional processes.

An embodiment of this invention is a process for manufacturing an optical data storage disk stamper for use in replicating compact disks. The process comprises the steps of providing an ion machinable ceramic substrate, such as chemically vapor-deposited silicon carbide (CVDSiC), having a toughness of at least about 1 MPa√m and depositing a layer of photoresist on a surface of the substrate. The photoresist is exposed with a source of electromagnetic energy, such as a laser, to form a data pattern in the photoresist. After exposure, the photoresist is developed to form a mask of the data pattern. The data pattern then is ion machined, such that a spiral track of at least one ridge and at least one land is formed in the substrate. Suitable ion machinable substrates may be machined without increasing surface roughness ($R_a$). After the substrate has been ion machined, the developed photoresist may be stripped from the substrate.

In another embodiment of this invention, a process for manufacturing an optical data storage disk stamper comprises the steps of providing an ion machinable ceramic substrate having a toughness of at least about 1 MPa√m, depositing a first layer of glass on a surface of the substrate and depositing a second layer of photoresist on the first layer of glass. The photoresist then is exposed with a source of electromagnetic energy to form a data pattern in the photoresist. After exposure, the photoresist is developed to form a mask of the data pattern on the first layer. The data pattern is etched, e.g., etched using an acid, such as hydrofluoric acid, in the first layer to form a glass mask on the substrate. The data pattern then is ion machined, such that a spiral track of at least one ridge and at least one land is formed in the substrate. After the substrate has been ion machined, the developed photoresist and the glass mask may be stripped from the substrate.

The present invention provides various technical advantages over known optical data storage disk stampers. A technical advantage of this invention is that the disk stamper is manufactured from a ceramic substrate. This allows the stamper to withstand high injection molding temperatures without suffering deformation. Further, ceramics present a smooth surface which may be easily polished. Ceramics also are tough, and unlike brittle soda-lime glass substrates, such as those currently used as templates on which to form electroformed stampers, ceramic substrates are not easily broken, cracked, or snapped under slight bending or deformation. Finally, ceramics may be readily machined using an ion beam, e.g., etched by exposure to neutral ion bombardment. It is a further technical advantage of this process that such substrates may be fixed directly to an injection molding apparatus as stampers. Such ceramic substrates are durable and can withstand the stresses and shock of replicating optical data storage disks with less deformation and damage and lower failure rates than conventional stampers.

It is yet another technical advantage of this invention that because the electroforming step and the manual procedures, e.g., removing the nickel stamper from the substrate and lacquering the stamper, associated with the finishing of an electroformed stamper are eliminated; the time and cost associated with manufacturing stampers are reduced by the processes of this invention. For example, manufacturing stampers according to a process of this invention may take no more than 90 minutes. This permits greater flexibility in manufacturing optical data storage disks and consequently, shorter production cycle times for preparing new disks for market. Moreover, because stampers produced according to the processes of this invention have longer lives, fewer stampers may be required to manufacture such disks, and data may be inexpensively and securely stored for longer periods. In addition, such improved stampers increase the efficiency of injection molding apparatus by decreasing time spent to replace deteriorated, deformed or damaged stampers. Finally, it is still another technical advantage of these processes that because the data pattern is ion machined directly into the ceramic substrate to create the stamper, a fixing hole may be formed in, e.g., punched through, the substrate before it is ion machined. Thus, the formation of the fixing hole does not create stresses in the spiral track.

Despite the disadvantages of CD stamper manufacturing processes using electroformed metals, which are described above, metals, such as nickel, are generally tough enough to withstand the about 30 tons of force, to which stampers are subjected in injection molding processes; metal substrates are inexpensive to mass produce relative to many suitable ceramic substrates; and metal substrates have desirable thermal properties for use in injection molding processes. For example, relatively brittle metals may have a toughness of at least about 10 MPa√m, and electroformed nickel may have a toughness of about 50 MPa√m. Generally, however, metals are polycrystalline and are not ion machinable. In their natural solid forms, metals possess various grain orientations, which erode at different rates in response to a uniform ion beam. These varying erosion rates result in surface roughening during ion-machining.

Nevertheless, certain metals, such as sputtered nickel or electroless nickel containing a sufficient amount of an additive to promote formation of a smooth and amorphous structure, e.g., phosphorous in an amount of about 5 to 15 percent by weight, are amorphous. If metals, such as electroless nickel, are amorphous, they may be ion machined without increasing the surface roughness. Amorphous nickel may be an especially desirable substrate material because electroformed, polycrystalline nickel is a common stamper material used in optical data storage disk stamper manufacturing processes, and nickel is a material with which stamper manufacturers are generally familiar. However, amorphous metal substrates are used in the new stamper manufacturing process, e.g., a process utilizing ion machining. The amorphous nickel has a different microstructure than, for example, the electroformed nickel employed in previous manufacturing processes.

An embodiment of this invention is a process for manufacturing an optical data storage disk stamper for use in replicating compact disks. The process comprises the steps of providing an ion machinable amorphous metal substrate, such as electroless nickel including phosphorus in a range of about 5 to 15 percent by weight, having a toughness of at least about 10 MPa√m, e.g., about 100 MPa√m for amorphous electroless nickel; and depositing a layer of photoresist on a surface of the substrate. The photoresist is exposed with a source of electromagnetic energy, such as a laser, to form a data pattern in a photoresist. After exposure, the photoresist is developed to form a mask of the data pattern. The data pattern then is ion machined, such that a spiral track of at least one ridge and at least one land is formed in the substrate. Suitable ion machinable substrates may be machined without increasing surface roughness ($R_a$). After the substrate has been ion machined, the developed photoresist may be stripped from the substrate.

The amorphous metal may be selected from the group consisting of gold, nickel, and copper, or the like. In particular, the substrate may be electroless nickel including phosphorous in a range of about 5 to 15 percent by weight or sputtered nickel. In addition, the substrate may include a substrate base with a catalytically active surface and an amorphous metal film. The substrate base need not have an amorphous structure and may be made from a metal selected from aluminum, nickel, and copper, or the like; and the amorphous metal film may also be made from gold, nickel, and copper, or the like. As noted above with respect to electroless nickel, the amorphous film material may also include an element or compound which promotes the formation of a smooth and amorphous film. Moreover, the amorphous metal film may have a thickness in a range of about 200 to 1000 nm.

The photoresist may be a sputtered oxide photoresist or a negative-tone photoresist, or the like. Further, the source of electromagnetic energy used to expose the photoresist may be a laser, and the step of exposing the photoresist may include utilizing a computer to direct the source of electromagnetic energy.

In another embodiment of the invention, a process for manufacturing an optical data storage disk comprises the step of manufacturing a negative, optical data storage disk stamper from an amorphous metal substrate by the process described above. Further, the process may comprise the steps of fixing the optical data storage disk stamper in a mold; injecting a thermoplastic resin into the mold to form a positive disk replica of the stamper, and removing the replica from the mold. The replica may then be overcoated with a reflective material to obtain a reflective surface on the disk. The reflective material may be a metal selected from the group consisting of aluminum and gold.

In another embodiment of this invention, a process for manufacturing an optical data storage disk stamper comprises the steps of providing an ion machinable amorphous substrate having a toughness of at least about 10 MPa√m, e.g., about 100 MPa√m for amorphous electroless nickel, depositing a first layer of glass on a surface of the substrate and depositing a second layer of photoresist on the first layer of glass. The photoresist then is exposed with a source of electromagnetic energy to form a data pattern in the photoresist. After exposure, the photoresist is developed to form a mask of the data pattern on the first layer. The data pattern is etched, e.g., using an acid, such as hydrofluoric acid, in the first layer to form a glass mask on the substrate. The data pattern then is ion machined, such that a spiral track of at least one ridge and at least one land is formed in the substrate. After the substrate has been ion machined, the developed photoresist and the glass mask may be stripped from the substrate.

In a further embodiment of the invention, a process for manufacturing an optical data storage disk may comprise the steps of manufacturing a negative, optical data storage disk stamper from an amorphous metal substrate by the process described above, in which a first layer of glass is deposited on a surface of the substrate and a second layer of photoresist deposited on the first layer. The process further comprises the steps of fixing the optical data storage disk stamper in a mold; injecting a thermoplastic resin into the mold to form a positive replica of the stamper; and removing the replica from the mold.

The amorphous metal substrate may comprise either a monolithic structure or a film of amorphous metal on a substrate base. A substrate including a film of amorphous metal on a substrate base may be less expensive to manufacture than a monolithic structure. The substrate may have an outer diameter of greater than about 120 mm, and preferably, an outer diameter in a range of about 120 to 160 mm. This diameter may be obtained by punching the amorphous metal substrate from a larger substrate diameter either before or after ion machining. Similarly, the substrate may have an inner diameter in a range of about 15 to 36 mm. This diameter may be obtained by punching a core from a larger substrate diameter before or after ion machining. Surface roughness on the substrate face subjected to ion machining may be in a range of about 1 to 50 nm $R_a$, and the substrate may have a thickness greater than or equal to 300 μm.

A photoresist may mask portions of the substrate that are to be pits or lands on the replicated optical data storage disks. These areas to be masked may be about 0.6 μm wide, and in a range of about 0.8 to 3.5 μm long for regular optical data storage disks, and these dimensions may be smaller by up to half for high-density optical data storage disks. As noted above, the photoresist may be either a sputtered oxide photoresist or negative-tone photoresist, or the like. The masked substrate may then be placed in a vacuum chamber, beneath an ion beam gun with a diameter larger than the substrate. Alternatively, a smaller ion source may be rastered across the substrate surface. The substrate may be machined for a period determined by the size and intensity of the ion beam, e.g., about ten minutes, to achieve the desired feature depth on the stamper, e.g., less than about 150 nm. Further, for high density optical data storage disks, the desired feature depth on the stamper may be less than about 100 nm.

Other objects, advantages, and features will be apparent when the detailed description of the invention and the drawings are considered.

BRIEF DESCRIPTION OF THE DRAWINGS

For a more complete understanding of the present invention and the technical advantages thereof, reference is made to the following description taken in conjunction with accompanying drawings, in which.

DETAILED DESCRIPTION OF THE INVENTION

Figure 3A:
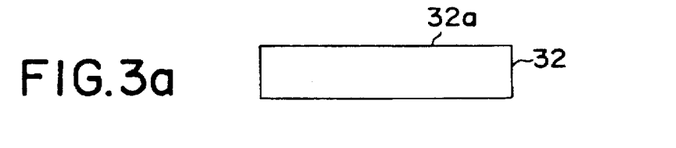
FIGS. 3a–f are a schematic of cross-sectional illustrations showing steps in an embodiment of the process of the present invention.

FIGS. 3a–f are a schematic of cross-sectional illustrations showing steps in an embodiment of the process of the present invention. FIG. 3a depicts a ceramic substrate 32 with a substrate surface 32a. Such substrates may have a diameter greater than about 120 mm and a thickness greater than about 1 mm. A ceramic is one of a diverse group of nonmetallic, inorganic solids. Although traditional ceramics may be crystalline or glassy, i.e., amorphous, only ion machinable ceramic substrates with a toughness of at least about 1 MPa√m are suitable for the processes of this invention. Generally, crystalline ceramics with a toughness greater than about 2 MPa√m possess high flexural strength and are shock resistant, which makes them especially well-suited for use as part of an injection molding apparatus.

Suitable ceramic substrates 32 are characterized by the ability to repeatedly withstand high temperatures associated with the injection molding of thermoplastic resins; a smooth, polishable surface; toughness sufficient to withstand injection molding pressures and stress concentration created between the minute ridges during the cooling of the thermoplastic resin; and ion machinability. For example, ceramic substrates 32 are capable of withstanding temperatures in a range of about 250° to 340° C., which are associated with the injection molding of polycarbonate. Further, ceramic substrates 32 are capable of repeatedly withstanding steep temperature gradients caused by injection molding. The surface of ceramic substrates 32 has or may be polished to a surface roughness ($R_a$) of about 1 nm and a flatness of about 6 µm. In addition, when fixed in an injection molding apparatus, such smooth surfaces form smooth and reflective lands (not shown). These lands readily reflect electromagnetic energy, e.g., light or laser beams.

Glass and some ceramics are characterized by brittleness which causes them to break, crack, or snap when slightly bent or deformed. Suitable ceramic substrates 32, however, are tough, e.g., having a toughness of at least about 1 MPa √m, and possess sufficient rigidity to maintain an ion machined data pattern without deforming under injection molding pressures. At the same time, they possess sufficient flexibility to give to avoid failing under injection molding pressures. Such ceramic substrates may be subjected repeatedly to pressures in a range of about 70 to 140 MPa in an injection molding apparatus.

Suitable ceramic substrates are also characterized by the ability to be ion machined. Ion machining is performed by bombarding substrate surface 32a with a neutral ion beam, whereby, substantially vertical walls may be cut in ceramic substrate 32. Ceramics with suitable ion machining properties include silicon, canasite, silicon carbide, including CVDSiC, glassy or amorphous carbon, and the like. Although glass, such as soda-lime glass is ion machinable, as can be seen from the representative toughness values in the following table, such glass is not sufficiently tough to withstand injection molding pressures.

TABLE I

|  | Soda-Lime Glass | Glassy Carbon | Silicon | Canasite | Silicon Carbide | Amorphous Electroless Nickel |
|---|---|---|---|---|---|---|
| Toughness (MPa√m) | 0.7–0.8 MPa√m | 1 MPa√m | 1.8 MPa√m | 4 MPa√m | 4.5 MPa√m | ~100 MPa√m |

Figure 3B:
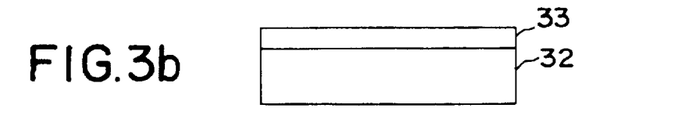

Referring to FIG. 3b, a layer of photoresist 33 is deposited on surface 32a of ceramic substrate 32. Photoresist layer 33 is applied to a uniform depth across surface 32a. For example, photoresist layer 33 may have a thickness in a range of about 0.1 to 2 µm. It may be applied as a dry laminate film or as a liquid that is spin or spray applied to surface 32a. A positive or negative photoresist may be used. As discussed above, when a positive photoresist is used, areas exposed to light are removed by the development process. Conversely, when a negative photoresist is used, areas not exposed to light are removed by the development process.

Alternatively, substrate 32 may be an ion machinable amorphous metal substrate, such as may be made from amorphous electroless nickel including phosphorus in a range of about 5 to 15 percent by weight, and preferably in a range of about 9 to 15 percent by weight. Generally, suitable amorphous metals have toughnesses of at least about 10 MPa√m. For example, amorphous electroless nickel has a toughness of about 100 MPa√m, which makes it well-suited for use in an injection molding apparatus. Thus, suitable amorphous metal substrates also have the ability to repeatedly withstand high temperatures associated with the injection molding of thermoplastic resins; a smooth, polishable surface; and toughness sufficient to withstand injection molding pressures and stress concentration created between the minute ridges during the cooling of the thermoplastic resin; and ion machinability. In addition, like the ceramic substrates described above, the amorphous metal substrates may withstand the high temperatures and steep temperature gradients associated with injection molding.

Figure 3C:
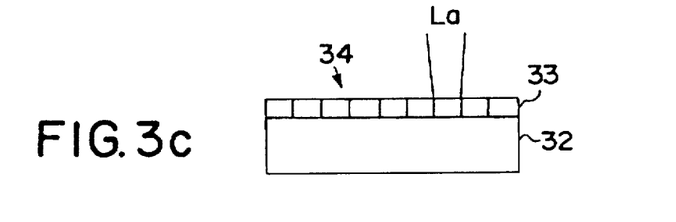

As shown in FIG. 3c, a source of electromagnetic energy, such as a laser La or other coherent, intense source of light, may be used to expose photoresist 33 to form a data pattern 34. As laser La is scanned on photoresist 33, substrate 32 may be rotated to expose data pattern 34 in a spiral shape on photoresist 33. Further, the size of the spot produced by laser La on the surface of photoresist 33, the speed of revolution of substrate 32, and the scanning speed of laser La may be varied to adjust data pattern 34. Laser La also may be intensity modulated to produce a series of ridges (not shown). Generally, data pattern 34 forms a spiral track of at least one ridge and at least one land in photoresist 33.

Alternatively, if the intensity of laser La is maintained at a constant level, data pattern 34 may produce a single ridge. A recordable optical data storage disk may possess a single, continuous, spiral groove produced from a stamper having data pattern 34 including a single, continuous, spiral ridge. The groove of such a disk is at least partially filled with a recording medium, such as a photo-curable resin or dye. If a photo-curable resin or dye is used, a light source, such as a laser beam, may be used to produce a data pattern in the resin or dye.

Figure 3D:
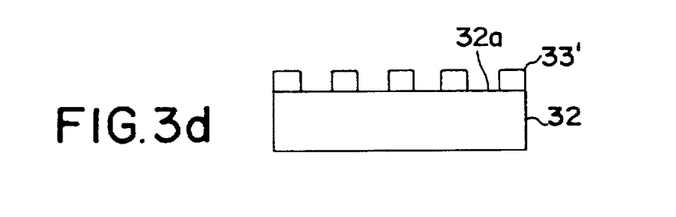

Referring to FIG. 3d, photoresist 33 then is developed to reveal data pattern 34 on its surface. Regardless whether photoresist 33 is a positive or negative photoresist, developed photoresist 33' remains on surface 32a of substrate 32 identifying the locations of the at least one ridge (not shown). Thus, the control of laser La is governed by the type of photoresist 33 deposited on substrate 32.

Figure 3E:
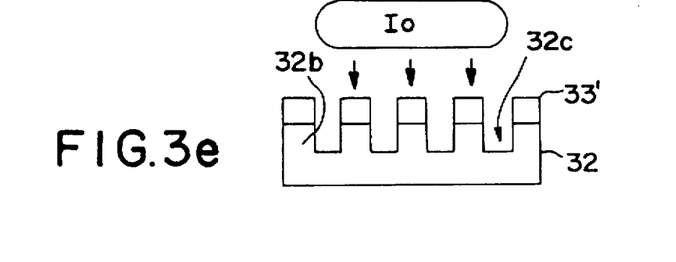
Figure 3F:
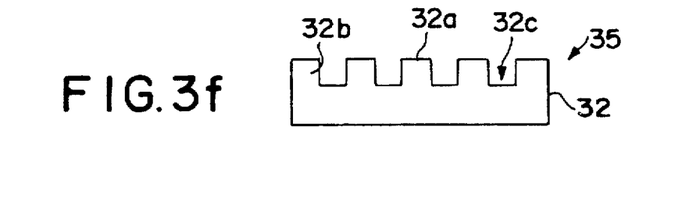

As shown in FIG. 3e, substrate 32 is ion machined to form at least one ridge 32b. The upper surface of ridge 32b is substrate surface 32a. Ion machining cuts into substrate 32 to a vertical depth, i.e., a ridge height, in a range of about 20 to 200 nm, e.g., in a range of about 100 to 150 nm. As discussed above, when ion machining, substrate 32 may be bombarded with a neutral, ion beam Io. Developed photoresist 33' forms a mask by which the machining of ridges 32b is controlled. Once the desired height for each of ridges 32b is achieved, the remaining developed photoresist 33' is stripped away to produce a stamper 35, as shown in FIG. 3f.

Figure 4:
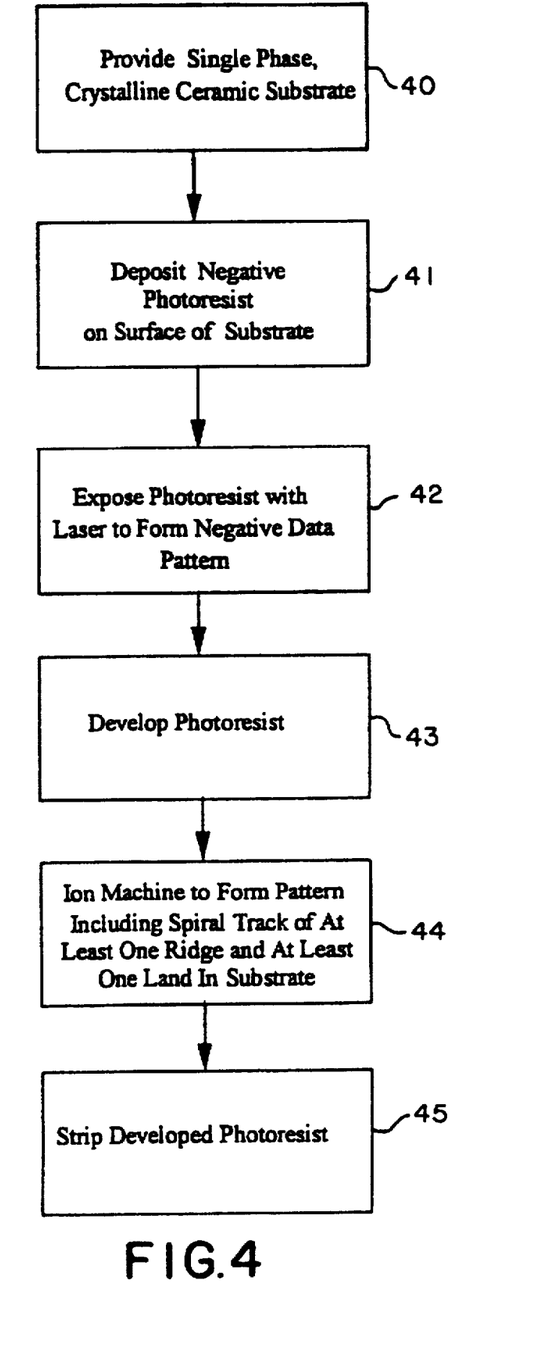
FIG. 4 is a flow chart depicting the steps of the embodiment of FIGS. 3a–f.

FIG. 4 is a flow chart depicting the steps of an embodiment according to FIGS. 3a–f. In step 40, a single phase, crystalline ceramic substrate is provided. A suitable single phase ceramic substrate is CVDSiC, which possesses a polycrystalline/single phase structure. Most amorphous and single crystal/single phase ceramics are ion machinable without increasing surface roughness. However, only selected polycrystalline ceramics are suitably ion machinable. Nevertheless, a single phase substrate has superior ion machining characteristics. Such substrates may readily be machined to form substantially vertical wall surfaces.

Alternatively, the substrate provided in step 40 may be an ion machinable amorphous metal substrate, such as may be made from amorphous electroless nickel including phosphorus in a range of about 5 to 15 percent by weight, and preferably in a range of about 9 to 15 percent by weight. Suitable amorphous metals have toughnesses of at least about 10 MPa√m. For example, amorphous electroless nickel has a toughness of about 100 MPa√m, which makes it well-suited for use in an injection molding apparatus. Thus, suitable amorphous metal substrates also have the ability to repeatedly withstand high temperatures associated with the injection molding of thermoplastic resins; a smooth, polishable surface; and toughness sufficient to withstand injection molding pressures and stress concentration created between the minute ridges during the cooling of the thermoplastic resin; and ion machinability. In addition, like the ceramic substrates described above, the amorphous metal substrates may withstand the high temperatures and steep temperature gradients associated with injection molding.

In step 41, a negative photoresist is deposited on the surface of the substrate. When exposed with a laser, as indicated in step 42, the negative photoresist reveals a series of spots corresponding to the ridges of the spiral track. When developed according to step 43, the unexposed photoresist dissolves, leaving only spots of developed photoresist marking the ridges.

As indicated in step 44, using the exposed photoresist as a mask, the substrate is ion machined to form a raised data pattern including a spiral track of at least one ridge and at least one land. Ion machining may be accomplished by bombarding the substrate with a stream of neutral ions, such as those of an inert gas, e.g., argon. The depth of ion machining is dependent on the duration and intensity of the bombardment and the characteristics of the substrate. Moreover, if the size of the ion beam is smaller than the surface of the substrate, the ion beam may be rastered in order to attain uniform machining.

Ion machining as a precision material removal process may be used in sub-aperture shaping of glasses, ceramics, and amorphous metal substrates. Ion machining, which is distinct from the process of Reactive Ion Etching (RIE), employs a plasma-generating source or "gun" that ionizes argon gas in an evacuated chamber. For example, while still in the gun, ionized argon atoms may be accelerated in a direct current (DC) electric field through a grid-shaped aperture. As the ions leave the gun at high velocity, the collimated beam of ions may be neutralized by an oblique beam of electrons emerging from an adjacent source. This stream of argon atoms, now chemically and electrically neutral, impacts a target surface and sputters molecules form the surface in a finely controlled erosion process. Beam current densities may be in a range of about 1 to 2 mA/cm$^2$, accelerated by an about 1000 volt potential. For many solids, this results in a sputtering rate of several tens of nanometers per minute. The process of the present invention permits production of billions of micrometer-sized lateral features with uniform high quality on a single substrate by broad beam ion machining through a photoresist mask.

Although both ceramics and amorphous metals may be ion machined, use of amorphous nickel as a substrate for stamper manufacturing has certain advantages over ceramics in an optical data storage disk manufacturing process. Amorphous nickel substrates may be less expensive, both in raw material and in fabrication costs, than ceramic substrates. Amorphous nickel is tougher, e.g., $K_c$ equals about 100 MPa$\sqrt{}$m, than even the toughest ceramics, e.g., $K_c$ in a range of about 2 to 5 MPa$\sqrt{}$m. Therefore, although an amorphous nickel substrate may plastically yield before a ceramic substrate, amorphous nickel substrates may better withstand injection molding without catastrophic fracture. Further, metals, and especially nickel, are materials whose thermal, mechanical, and handling properties are understood in the stamper manufacturing industry. Although, as used in the present invention, the nickel substrate's microstructure is amorphous, its bulk properties are similar to those of polycrystalline, electroformed nickel.

In addition, ion machining must be performed within a vacuum chamber. In a vacuum chamber, interference between the ion beam and air molecules is eliminated. Nevertheless, because heat generated in the substrate by ion machining is not easily dissipated within a vacuum chamber, the developed photoresist mask preferably is capable of withstanding temperatures in a range of about 30° to 80° C., so that the data pattern may be ion machined in the substrate without causing simultaneous deterioration the photoresist mask. Referring to step 45, the developed photoresist then is stripped from the substrate to produce an optical data storage disk stamper.

Figure 5A:
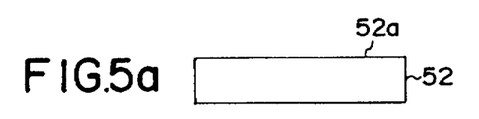
FIGS. 5a–i are a schematic of cross-sectional illustrations showing steps in another embodiment of the process of the present invention.
Figure 5B:
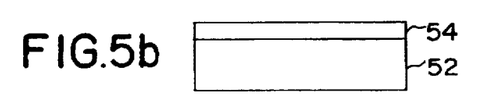
Figure 5C:
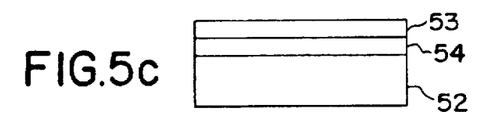

FIGS. 5a–i are a schematic of cross-sectional illustrations showing steps in another embodiment of the process of the present invention. FIG. 5a depicts a ceramic or an amorphous metal substrate 52 with a substrate surface 52a. Referring to FIG. 5b, a first layer of glass 54, e.g., fused silica, is deposited on surface 52a of ceramic substrate 52. First layer of glass 54 is deposited uniformly over the surface 52a of substrate 52 to a thickness in a range of about 0.1 to 1 μm. As shown in FIG. 5c, a second layer of photoresist, e.g., negative photoresist, is deposited on first layer of glass 54. Second layer of photoresist 53 also is deposited uniformly over first layer of glass 54. The thickness of second layer of photoresist 53 may be in a range of about 0.1 to 2 μm.

Figure 5D:
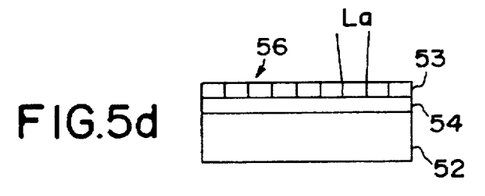

As indicated in FIG. 5d, a source of electromagnetic energy, such as a laser La or other coherent, intense source of light, may be used to expose photoresist 53 to form a data pattern 56. As laser La is scanned on photoresist 53, substrate 52 may be rotated to expose a spiral-shaped data pattern 56 on photoresist 53. As discussed above, the size of the spot of laser La on the surface of photoresist 53, the speed of revolution of substrate 52, and the scanning speed of laser La may be varied to alter data pattern 56. Laser La also may be intensity modulated to create the desired data pattern 56 for producing a series of ridges (not shown). Generally, data pattern 56 forms a spiral track of at least one ridge in photoresist 56. Alternatively, if the intensity of laser La is maintained at a constant level, data pattern 56 may produce a single ridge as discussed above.

Figure 5E:
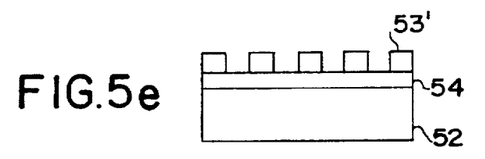

Referring to FIG. 5e, photoresist 53 then is developed to reveal data pattern 56 on first layer of glass 54. Regardless whether photoresist 53 is a positive or negative photoresist, developed photoresist 53' remains on first layer of glass 54 identifying the locations of the at least one ridge (not shown). Thus, data pattern 56 and the control of laser La are governed by the type of photoresist 53 applied to first layer of glass 54.

Figure 5F:
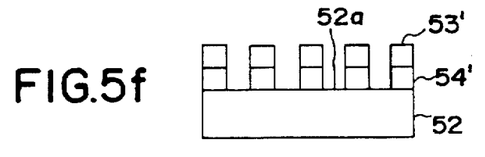
Figure 5G:
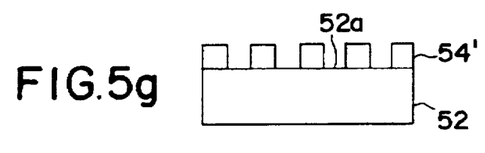
Figure 5H:
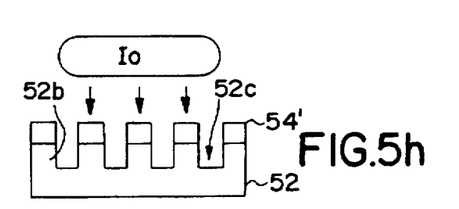
Figure 5I:
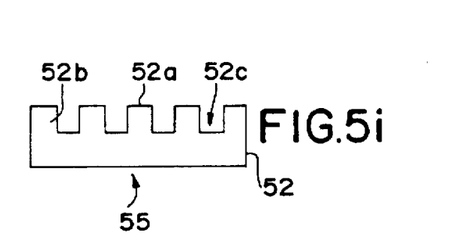

FIG. 5f depicts the etching, e.g., etching with an acid, such as hydrofluoric acid, of first layer of glass 54 to produce glass mask 54'. As shown in FIG. 5g, any portion of layer of developed photoresist 53', which was not etched away during the creation of glass mask 54', is stripped from glass mask 54'. Referring to FIG. 5h, substrate 52 is then ion machined to form at least one ridge 52b to substrate 52. As discussed above, when ion machining, the amorphous metal substrate is bombarded with a neutral, ion beam Io to cut into substrate 52 to a vertical depth, i.e., a ridge height, in a range of about 20 to 200 nm e.g., about 100 nm. The upper surface of each of ridges 52b is substrate surface 52a. Glass mask 54' controls the machining of ridges 52b. Once the desired height for ridges 52b is achieved, glass mask 54' remaining on substrate may be stripped away to produce a stamper 55, as shown in FIG. 5i.

Figure 6:
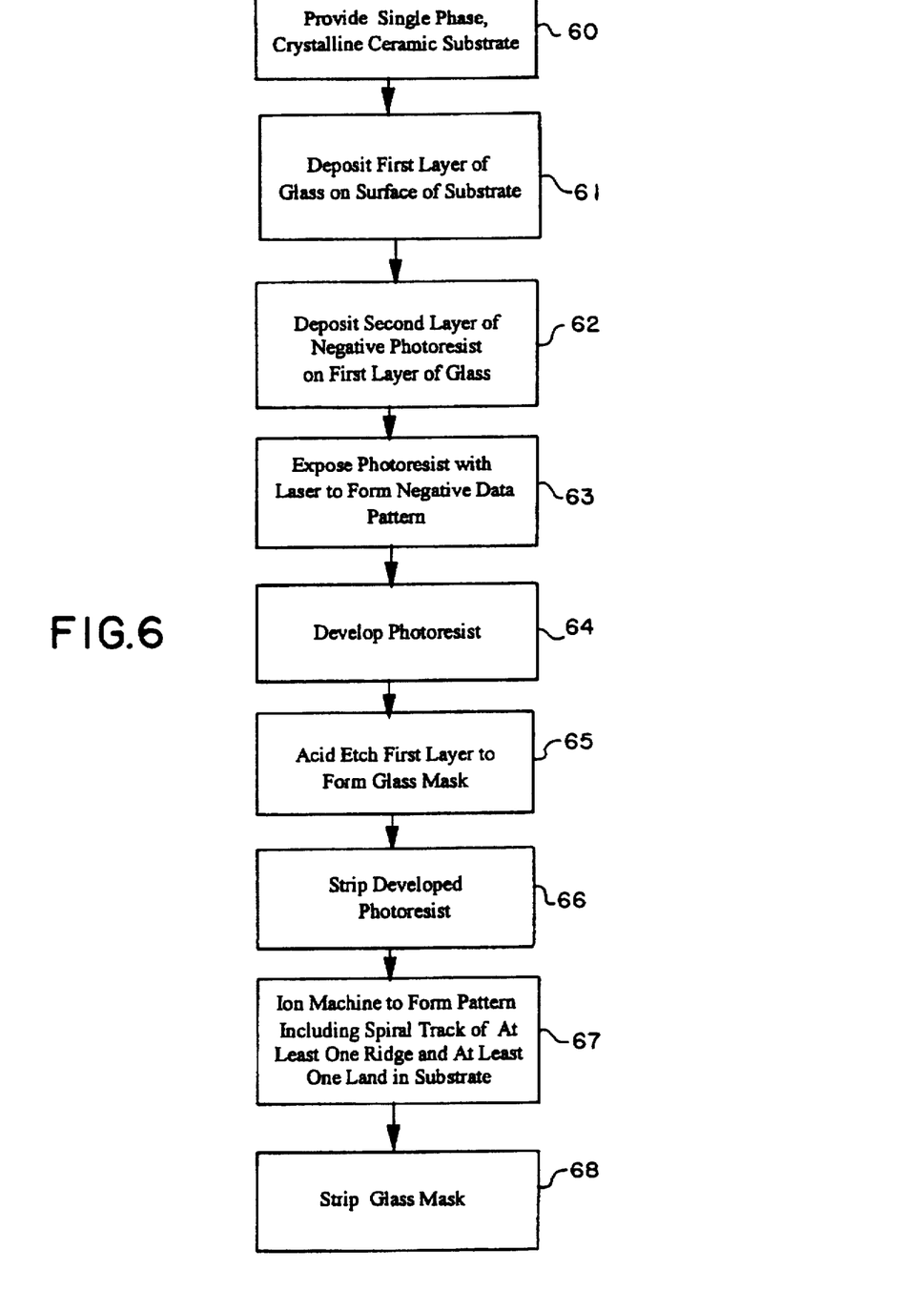
FIG. 6 is a flow chart depicting the steps of the embodiment of FIGS. 5a–i.

FIG. 6 is a flow chart depicting the steps of the embodiment of FIGS. 5a–i. In step 60, a single phase, crystalline ceramic substrate, such as a CVDSiC substrate, or an amorphous metal substrate, such as an amorphous electroless nickel substrate including phosphorous in a range of about 5 to 15 percent by weight, again is provided. As indicated in step 61, a first layer of glass is deposited on the surface of the ceramic or amorphous metal substrate. In step 62, a second layer of negative photoresist is applied to the surface of the first layer of glass. When exposed with a laser, as indicated in step 63, the negative photoresist creates a series of spots corresponding to the at least one ridge of the spiral track. When developed according to step 64, the unexposed photoresist dissolves, leaving only spot(s) of developed photoresist marking the at least one ridge.

As indicated in step 65, using the exposed photoresist as a mask, the first layer of glass is etched with acid to form a glass mask. This acid etching may remove the layer of photoresist from the first layer of glass. After the first layer is etched, however, the remaining developed photoresist is stripped away, as indicated in step 66. In step 67, the ceramic or amorphous metal substrate is ion machined through the glass mask to form a negative die of the data pattern including a spiral track of at least one ridge and at least one land. Finally, according to step 68, the glass mask also is stripped from the substrate.

As previously discussed, ion machining may be accomplished by bombarding the substrate with a stream of neutral ions, such as those of an inert gas, e.g., argon. The depth of ion machining is dependent on the duration and intensity of the bombardment and the characteristics of the substrate. Moreover, if the size of the ion beam is smaller than the surface of the substrate, again, the ion beam may be rastered in order to attain uniform machining. Nevertheless, as discussed above, suitable ceramic materials are ion machinable without increasing surface roughness ($R_a$).

Figure 7:
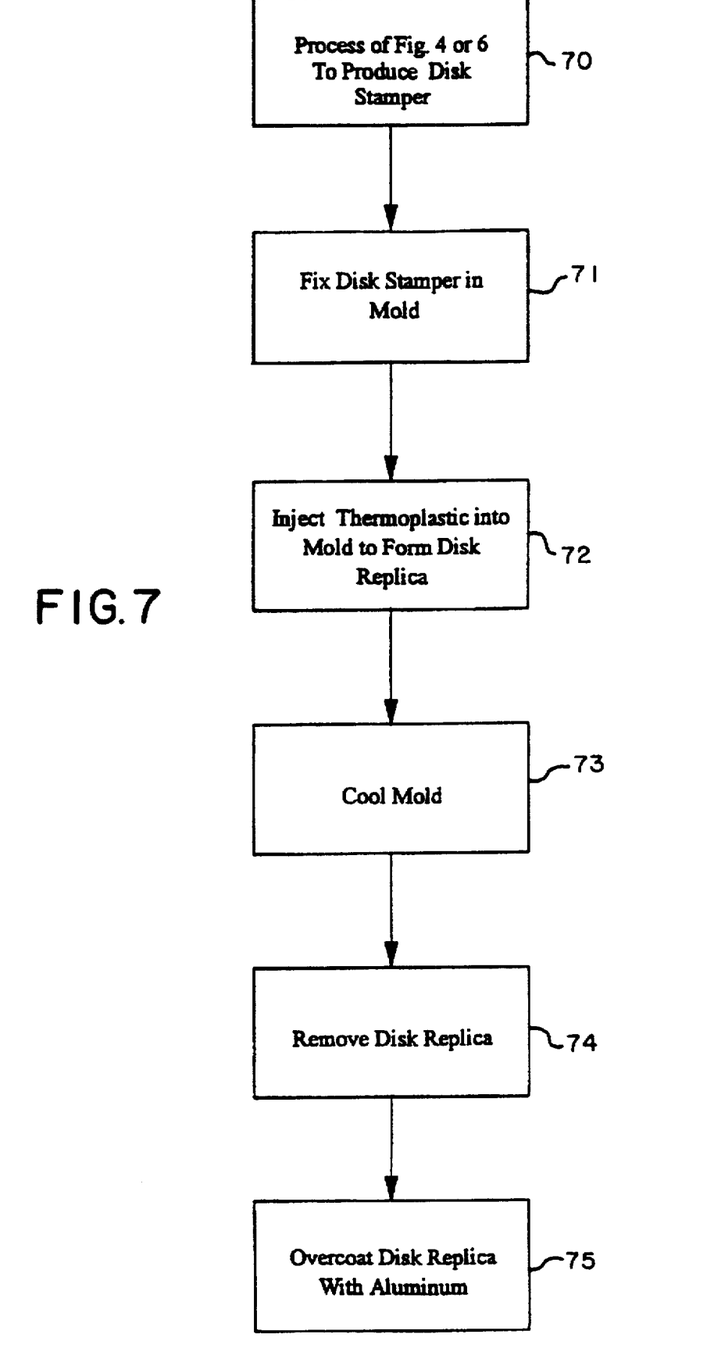
FIG. 7 is a flow chart depicting the steps of a process of the invention using a stamper produced according to a process described in FIG. 4 or 6 to replicate an optical data storage disk.

FIG. 7 is a flow chart depicting the steps of a process of the invention employing a stamper, such as that described in FIG. 4 or 6, to replicate optical data storage disks. See step 70. In step 71, the disk stamper, such as stamper 35 or 55, is fixed in a disk stamper mold of an injection molding apparatus. Such injection molding apparatus and their use are well known. As indicated in step 72, a thermoplastic resin, such as acrylic resin, epoxy resin, polycarbonate resin, unsaturated polyester resin, or the like, may be injected into the mold to form a disk replica.

After the mold cools as indicated in step 73, the disk replica may be removed from the mold, step 74. Each disk replica then may be trimmed to remove excess thermoplastic resin. Because the stamper is made from a tough ceramic substrate, the stamper is designed to repeatedly withstand the pressure and temperature variations within the injection molding apparatus, without deforming or physically damaging the stamper. In step 75, the disk replica is overcoated, e.g., sputtered, with a reflective material, such as aluminum or gold, including alloys containing these metals. This reflective material ensures that light beams from an optical read-out device are reflected when they strike the at least one land of the spiral track data pattern on the disk replica.

Production of metal substrates, whether by electroforming or by amorphous electroless forming, is a source of hazardous chemical waste. Further, as noted above, nickel may transfer unacceptable visible stains to the optical data storage replica disks. This may lower process yields. Finally, unlike the pre-machined ceramic substrates, amorphous electroless nickel substrate may be punched at the end of the substrate machining process, but before injection molding.

There are several methods of producing an amorphous metal substrate. The amorphous metal may be formed as a film either by use of an electroless chemical bath or by sputtering. Either of these processes may be used to adhere an amorphous metal film to a catalytically active surface of a base substrate, e.g., the surface of an electroformed, rolled, or wrought base substrate of aluminum, nickel, or copper, or the like. The amorphous film may only be as thick as the desired ion-machining depth. Although thicker films are not undesirable, they may be more expensive to produce. The amorphous film may also be deposited to full thickness on a non-metallic stamper substrate platform. The amorphous film may be made smooth by lapping and polishing or by growing it on a smooth surface, such as a polished glass substrate platform, from which it may later be removed. In each of these methods, the amorphous metal substrate may be made using large scale batch processes, stored indefinitely, and stockpiled for later ion machining by stamper manufacturers.

For example, a method of preparing an electroless nickel film is described in detail below. First, a glass plate, upon which an electroless nickel film is to be grown, is polished. Because the glass plate is polished, electroless nickel deposited on the glass plate forms a smooth surface at the nickel/glass interface. Second, the glass surface may be activated, for example, by nucleation in a colloidal palladium suspension or the like. An amorphous nickel film with a depth in a range of about 200 to 1000 nm is deposited by a chemical electroless nickel process. Sufficient phosphorous, e.g., in a range of about 5 to 15 percent by weight, is added to induce growth of a smooth and amorphous electroless nickel film. Third, a substrate base of electroformed nickel or another metal may be grown on the amorphous film to a achieve cumulative thickness of greater than or equal to about 300 μm. The substrate base and the amorphous film are permanently atomically bonded and may be removed from the glass. Finally, the amorphous metal substrate may be punch to an oversized diameter, such as about 138 mm.

Figure 8A:
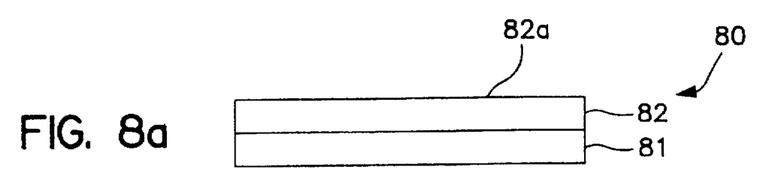
FIGS. 8a–f are a schematic of cross-sectional illustrations showing steps in an embodiment of the process of the present invention.

FIGS. 8a–f are a schematic of cross-sectional illustrations showing steps in an embodiment of the process of the present invention. FIG. 8a depicts an amorphous metal substrate 80 comprising a substrate base 81 and an amorphous metal film 82 with a substrate surface 82a. Such substrates may have a diameter greater than about 120 mm and a thickness greater than or equal to about 300 μm, and such amorphous metal films may have a thickness in a range of about 200 to 1000 nm. Suitable amorphous metal substrates are characterized by the ability to be ion machined. Ion machining is performed by bombarding substrate surface 82a with a neutral ion beam, whereby, substantially vertical walls may be cut in amorphous metal film 82.

Figure 8B:
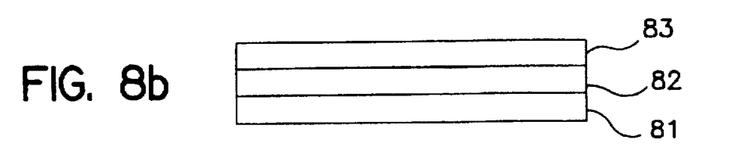

Referring to FIG. 8b, a layer of photoresist 83 is deposited on surface 82a of amorphous metal film 82. Photoresist layer 83 is applied to a uniform depth across surface 82a. For example, photoresist layer 83 may have a thickness in a range of about 0.1 to 2 μm. It may be applied as a dry laminate film or as a liquid that is spin or spray applied to surface 82a. A positive or negative photoresist may be used. As discussed above, when a positive photoresist is used, areas exposed to light are removed by the development process. Conversely, when a negative photoresist is used, areas not exposed to light are removed by the development process.

Figure 8C:
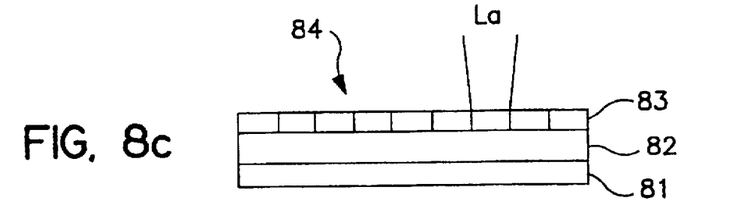

As shown in FIG. 8c, a source of electromagnetic energy, such as a laser La or other coherent, intense source of light, may be used to expose photoresist 83 to form a data pattern 84. As laser La is scanned on photoresist 83, substrate 80 may be rotated to expose data pattern 84 in a spiral shape on photoresist 83. Further, the size of the spot produced by laser La on the surface of photoresist 83, the speed of revolution of substrate 80, and the scanning speed of laser La may be varied to adjust data pattern 84. Laser La also may be intensity modulated to produce a series of ridges (not shown). Generally, data pattern 84 forms a spiral track of at least one ridge and at least one land in photoresist 83.

Alternatively, if the intensity of laser La is maintained at a constant level, data pattern 84 may produce a single ridge. A recordable optical data storage disk may possess a single, continuous, spiral groove produced from a stamper having data pattern 84 including a single, continuous, spiral ridge. The groove of such a disk is at least partially filled with a recording medium, such as a photo-curable resin or dye. If a photo-curable resin or dye is used, a light source, such as a laser beam, may be used to produce a data pattern in the resin or dye.

Figure 8D:
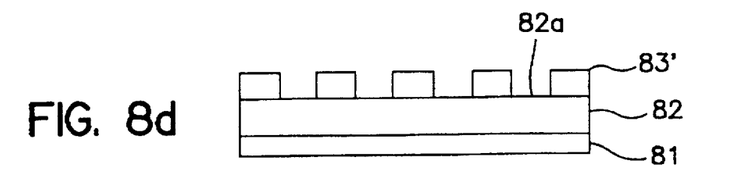

Referring to FIG. 8d, photoresist 83 then is developed to reveal data pattern 84 on its surface. Regardless whether photoresist 83 is a positive or negative photoresist, developed photoresist 83' remains on surface 82a of amorphous metal film 82 identifying the locations of the at least one ridge (not shown). Thus, the control of laser La is governed by the type of photoresist 83 deposited on film 82.

Figure 8E:
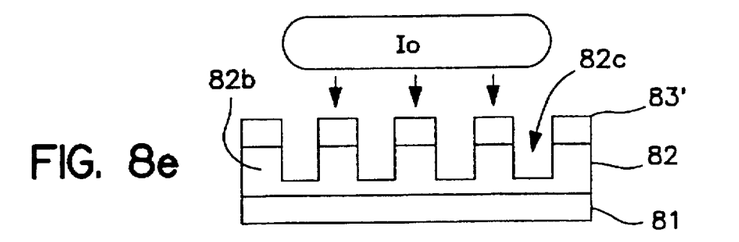
Figure 8F:
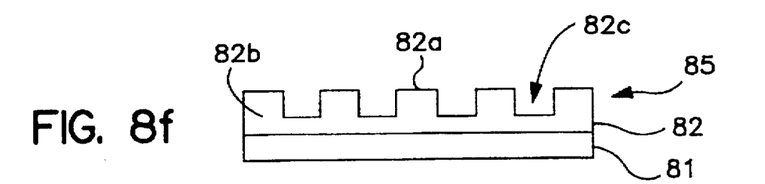

As shown in FIG. 8e, amorphous metal film 82 of substrate 80 is ion machined to form at least one ridge 82b. The upper surface of ridge 82b is substrate surface 82a. Ion machining cuts into substrate 82 to a vertical depth, i.e., a ridge height, of less than about 150 nm. As discussed above, when ion machining, substrate 80 may be bombarded with a neutral, ion beam Io. Developed photoresist 83' forms a mask by which the machining of ridges 82b is controlled. Once the desired height for each of ridges 82b is achieved, the remaining developed photoresist 83' is stripped away to produce a stamper 85, as shown in FIG. 8f.

Figure 9:
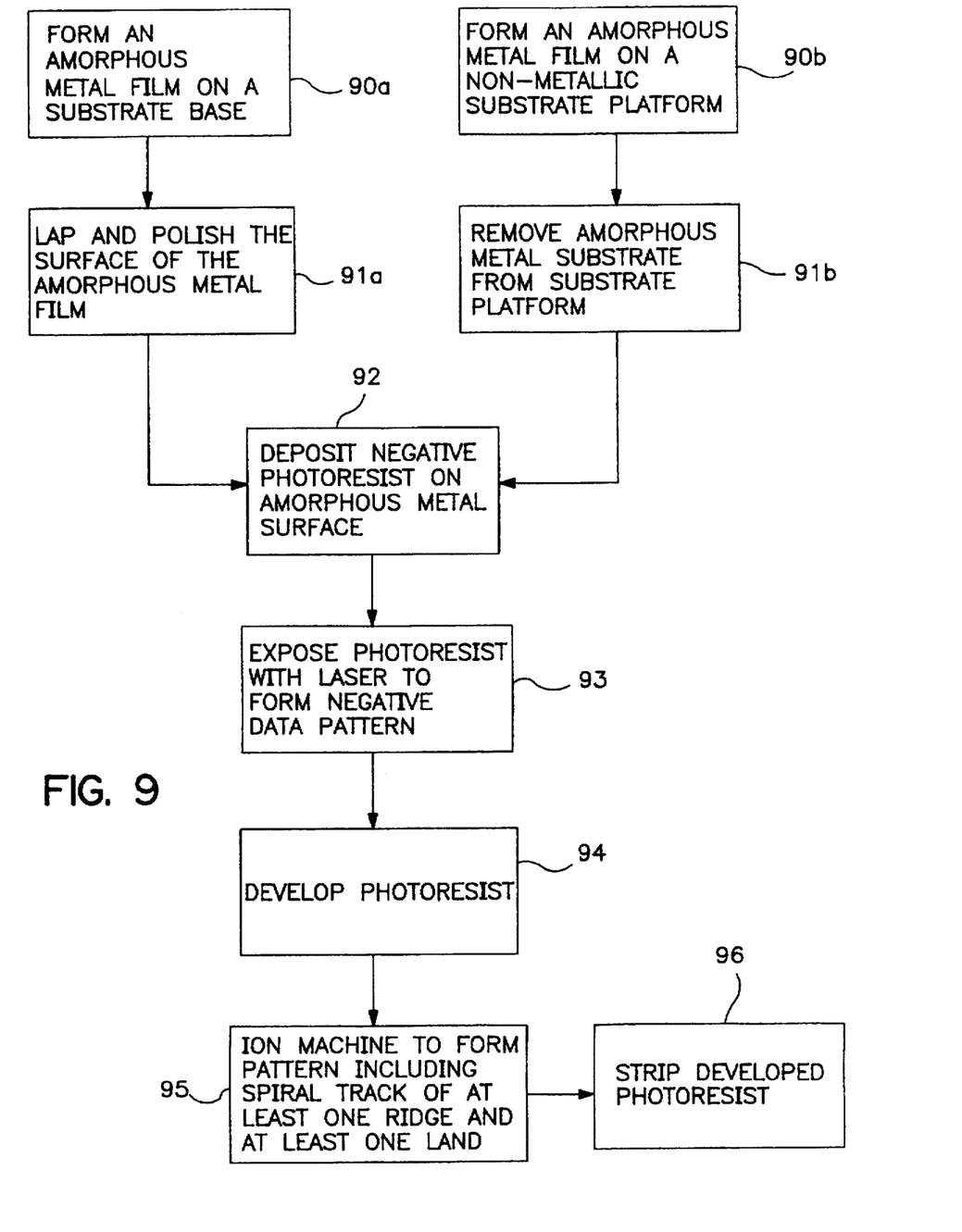
FIG. 9 is a flow chart depicting process steps including those of a process in accordance with the embodiment of FIGS. 8a–f.

FIG. 9 is a flow chart depicting the steps of embodiments of the process of the invention, including an embodiment in accordance with FIGS. 8a–f. In step 90a, an amorphous metal film, such as a film of amorphous electroless nickel including phosphorous in a range of about 5 to 15 percent by weight, is formed in an electroless chemical bath on a substrate base, for example, of electroformed, wrought or rolled metal, to provide a substrate. In step 91a, the substrate may then be lapped and polished. Alternatively, in step 90b, a monolithic substrate of amorphous metal may be provided by creating a substrate comprised of a single layer of amorphous metal formed in an electroless chemical bath on a non-metallic substrate platform, such as glass. In step 91b, the monolithic substrate is removed from the substrate platform. However, because the substrate platform may have a smooth surface, the amorphous metal substrate may not require further lapping or polishing.

In step 92, a negative photoresist is deposited on the surface of the substrate. When exposed with a laser, as indicated in step 93, the negative photoresist reveals a series of spots corresponding to the ridges of the spiral track. When developed according to step 94, the unexposed photoresist dissolves, leaving only spots of developed photoresist marking the ridges.

As indicated in step 95, using the exposed photoresist as a mask, the substrate is ion machined to form a raised data pattern including a spiral track of at least one ridge and at least one land. Ion machining may be accomplished by bombarding the substrate with a stream of neutral ions, such as those of an inert gas, e.g., argon. The depth of ion machining is dependent on the duration and intensity of the bombardment and the characteristics of the substrate. Moreover, if the size of the ion beam is smaller than the surface of the substrate, the ion beam may be rastered in order to attain uniform machining. Referring to step 96, the developed photoresist then is stripped from the substrate to produce an optical data storage disk stamper.

Although a detailed description of the invention has been provided above, it is to be understood that the scope of the invention is not to be limited thereby, but is to be determined by the claims which follow.

What is claimed is:

1. A process for manufacturing an optical data storage disk stamper, comprising the steps of:
   providing an ion machinable amorphous metal substrate having a toughness of at least about 10 MPa√m;
   depositing a layer of photoresist on a surface of said substrate;
   exposing said photoresist with a source of electromagnetic energy to form a data pattern in said photoresist;
   developing said photoresist; and
   ion machining said data pattern, such that a spiral track of at least one ridge and at least one land is formed in said substrate.

2. The process of claim 1, wherein said photoresist is a sputtered oxide photoresist.

3. The process of claim 1, wherein said photoresist is a negative-tone photoresist.

4. The process of claim 1, wherein said substrate has a surface roughness ($R_a$) in a range of about 1 to 50 nm and a flatness of about 6 μm.

5. The process of claim 1, wherein said substrate has an outer diameter greater than about 120 mm, an inner diameter in a range of about 15 to 36 mm.

6. The process of claim 1, wherein said substrate has a thickness greater than or equal to about 300 μm.

7. The process of claim 1, wherein said at least one ridge has a height of less than about 150 nm.

8. The process of claim 1, wherein said source of electromagnetic energy is a laser.

9. The process of claim 1, wherein said step of exposing said photoresist includes utilizing a computer to direct said source of electromagnetic energy.

10. The process of claim 9, wherein said step of ion machining comprises using a rasterized ion beam.

11. The process of claim 1, wherein said substrate is amorphous electroless nickel including phosphorous in a range of about 5 to 15 percent by weight.

12. The process of claim 1, wherein said amorphous metal is selected from the group consisting of gold, nickel, and copper.

13. The process of claim 1, wherein said substrate comprises a substrate base with a catalytically active surface and an amorphous metal film.

14. The process of claim 13, wherein said substrate base is made from a metal selected from the group consisting of aluminum, nickel, and copper.

15. The process of claim 13, wherein said amorphous metal film is made from a metal selected from the group consisting of gold, nickel, and copper.

16. The process of claim 13, wherein said amorphous metal film has a thickness in a range of about 200 to 1000 nm.

17. The process of claim 1, wherein said at least one ridge is a single, continuous, spiral ridge, such that a single, continuous groove is stamped in a recordable optical data storage disk.

18. An optical data storage disk stamper produced by the process of claim 1.

19. A process for manufacturing an optical data storage disk, comprising the steps of:
   manufacturing a negative, optical data storage disk stamper by the process of claim 1;
   fixing said optical data storage disk stamper in a mold;
   injecting a thermoplastic resin into said mold to form a positive disk replica of said stamper; and
   removing said positive disk from said mold.

20. The process of claim 19, further comprising the step of overcoating said positive disk with a reflective material to obtain a reflective surface on said disk.

21. The process of claim 20, wherein said reflective material is a metal selected from the group consisting of aluminum and gold.

22. A process for manufacturing an optical data storage disk stamper, comprising the steps of:
   providing an electroless nickel substrate including phosphorous in a range of about 5 to 15 percent by weight;
   depositing a negative photoresist having a thickness in a range of about 0.1 to 2 μm on a surface of said substrate;
   exposing said photoresist with a laser to form a negative, data pattern in said photoresist;
   developing said photoresist;
   ion machining said substrate, such that a spiral track of at least one ridge and at least one land is formed in said substrate, wherein each of said ridge at least one ridge has a height of less than about 150 nm; and
   stripping said developed photoresist.

23. The process of claim 22, wherein said substrate has a diameter greater than about 120 mm.

24. The process of claim 23 wherein said substrate comprises a substrate base with a catalytically active surface and an amorphous metal film.

25. The process of claim 24, wherein said substrate base is made from a metal selected from the group consisting of aluminum, nickel, and copper.

26. The process of claim 24, wherein said amorphous metal film is made from a metal selected from the group consisting of gold, nickel, and copper.

27. The process of claim 24, wherein said amorphous metal film has a thickness in a range of about 200 to 1000 nm.

28. The process of claim 22, wherein said substrate has a thickness greater than or equal to about 300 μm.

29. A process for manufacturing an optical data storage disk stamper, comprising the steps of:

providing an ion machinable amorphous metal substrate having a toughness of at least about 10 MPa√m;

depositing a first layer of glass on a surface of said substrate depositing a second layer of photoresist on said first layer;

exposing said photoresist with a source of electromagnetic energy to form a data pattern in said photoresist;

developing said photoresist;

etching said data pattern in said first layer to form a glass mask; and ion machining said data pattern through said glass mask such that a spiral track of at least one ridge and at least one land is formed in said substrate.

30. The process of claim 29, further comprising the steps of:

stripping said developed photoresist; and stripping said glass mask.

31. The process of claim 29, wherein said first layer has a thickness in a range of about 0.1 to 1 μm.

32. The process of claim 29, wherein said second layer has a thickness in a range of about 0.1 to 2 μm.

33. The process of claim 29, wherein said step of etching said data pattern in said first layer comprises applying an acid to said first layer.

34. The process of claim 29, wherein said at least one ridge has a height of less than about 150 nm.

35. An optical data storage disk stamper produced by the process of claim 29.

36. A process for manufacturing an optical data storage disk, comprising the steps of:

manufacturing a negative, optical data storage disk stamper by the process of claim 29;

fixing said optical data storage disk stamper in a mold;

injecting a thermoplastic resin into said mold to form a positive replica of said stamper; and removing said replica from said mold.

* * * * *